(12) United States Patent
Kawamura et al.

(10) Patent No.: US 9,783,677 B2
(45) Date of Patent: Oct. 10, 2017

(54) POLYAMIDE RESIN COMPOSITION AND MOLDED BODY

(71) Applicant: ASAHI KASEI CHEMICALS CORPORATION, Tokyo (JP)

(72) Inventors: Tomoyo Kawamura, Tokyo (JP); Teruaki Sakuma, Tokyo (JP); Kazunori Terada, Tokyo (JP)

(73) Assignee: ASAHI KASEI CHEMICALS CORPORATION, Tokyo (JP)

(*) Notice: Subject to any disclaimer, the term of this patent is extended or adjusted under 35 U.S.C. 154(b) by 0 days.

(21) Appl. No.: 14/897,017

(22) PCT Filed: Apr. 16, 2014

(86) PCT No.: PCT/JP2014/060850
§ 371 (c)(1),
(2) Date: Dec. 9, 2015

(87) PCT Pub. No.: WO2014/203606
PCT Pub. Date: Dec. 24, 2014

(65) Prior Publication Data
US 2016/0152826 A1    Jun. 2, 2016

(30) Foreign Application Priority Data

Jun. 20, 2013 (JP) ................. 2013-129862

(51) Int. Cl.
| C08L 83/00 | (2006.01) |
| C08L 77/06 | (2006.01) |
| C08K 7/14 | (2006.01) |
| C08K 9/04 | (2006.01) |
| C08L 101/06 | (2006.01) |

(52) U.S. Cl.
CPC ............. *C08L 77/06* (2013.01); *C08K 7/14* (2013.01); *C08K 9/04* (2013.01); *C08L 101/06* (2013.01)

(58) Field of Classification Search
CPC ...................................... C08L 77/06
See application file for complete search history.

(56) References Cited

U.S. PATENT DOCUMENTS

| 5,352,741 A | 10/1994 | Dierickx et al. |
| 5,919,865 A | 7/1999 | Perret et al. |
| 2001/0047050 A1 | 11/2001 | Oyamada et al. |
| 2003/0036625 A1* | 2/2003 | Nozaki ............ C08K 3/34 528/170 |
| 2010/0137516 A1 | 6/2010 | Hert et al. |
| 2013/0150517 A1 | 6/2013 | Tarbit et al. |
| 2013/0261256 A1 | 10/2013 | Ieda et al. |

FOREIGN PATENT DOCUMENTS

| JP | 361-76540 A | 4/1986 |
| JP | H02-003490 A | 1/1990 |
| JP | H10-67931 A | 3/1998 |
| JP | H10-204286 A | 8/1998 |
| JP | H11-226949 A | 8/1999 |
| JP | 2000-319505 A | 11/2000 |
| JP | 2002-047412 A | 2/2002 |
| JP | 2004-300278 A | 10/2004 |
| JP | 2005-232239 A | 9/2005 |
| JP | 2005-320370 A | 11/2005 |
| JP | 2006-291118 A | 10/2006 |
| JP | 2007-031505 A | 2/2007 |
| JP | 2007-112877 A | 5/2007 |
| JP | 2007-119775 A | 5/2007 |
| JP | 2009-209227 A | 9/2009 |
| JP | 2010-269995 A | 12/2010 |
| JP | 2010-270327 A | 12/2010 |
| JP | 2011-068874 A | 4/2011 |
| JP | 2014-503003 A | 2/2014 |
| WO | 03-099930 A1 | 12/2003 |
| WO | 2008-043958 A2 | 4/2008 |
| WO | 2012-024268 A1 | 2/2012 |
| WO | 2012-093722 A1 | 7/2012 |

OTHER PUBLICATIONS

Machine Translation of JP 2005-232239 (2005).*
"Polymer Technology Dictionary." p. 499, Table 4 (1994).*
International Search Report issued with respect to application No. PCT/JP2014/060850, mail date is Jul. 22, 2014.
International Preliminary Report on Patentability issued with respect to application No. PCT/JP2014/060850, mail date is Dec. 22, 2015.

* cited by examiner

*Primary Examiner* — Hannah Pak
(74) *Attorney, Agent, or Firm* — Greenblum & Bernstein, P.L.C.

(57) ABSTRACT

The polyamide resin composition of the present invention contains (A) a polyamide resin, (B) a glass fiber including a compound having a carboxylic anhydride-containing unsaturated vinyl monomer, the compound being on at least a part of a surface of the glass fiber, and (C) a copolymer including a carboxylic anhydride-containing unsaturated vinyl monomer and having a glass transition temperature Tg of higher than 0° C.

15 Claims, No Drawings

POLYAMIDE RESIN COMPOSITION AND MOLDED BODY

TECHNICAL FIELD

The present invention relates to a polyamide resin composition and a molded body.

BACKGROUND ART

In recent years, a glass fiber-reinforced polyamide resin has been used as a metal substitute material for mechanism elements for automobiles, and the like, because of being excellent in strength, heat resistance, chemical resistance, specific gravity, and the like. In particular, engine peripheral members are demanded to have strength, vibration fatigue resistance, and the like under a high temperature environment, and therefore a reinforced polyamide resin composition is suitable therefor and various glass fiber-reinforced polyamide resin compositions are proposed (see, for example, Patent Literatures 1 and 2).

As the reduction in weight of automobile parts by the metal substitute material has been advanced, however, enhanced performance demands for such parts have been developed in recent years. Inter alia, in order to allow a glass fiber-reinforced polyamide resin to be applied to automotive structural members, long-term reliability has been demanded. In particular, in application to engine peripheral parts, enhancement in vibration fatigue resistance has been highly demanded.

In order to respond to such demands, for example, a glass fiber-reinforced polyamide resin composition containing an ethylene-based ionomer resin is proposed (see, for example, Patent Literature 3).

On the other hand, a technique of using a copolymer including a carboxylic anhydride-containing unsaturated vinyl monomer as an impact modifier is disclosed (see, for example, Patent Literature 4). In Patent Literature 4, a glass fiber-reinforced polyamide resin composition containing an ethylene/ethyl acrylate/maleic anhydride terpolymer is disclosed.

Furthermore, for the purpose of enhancement in the strength of a welded portion after welding, a glass fiber-reinforced polyamide resin composition containing polymaleic anhydride is disclosed (see, for example, Patent Literature 5).

In addition, for the purpose of enhancement in physical properties of recycled nylon, a polyamide resin composition including a polymer polymerized from maleic anhydride and an olefin is disclosed (see, for example, Patent Literature 6).

CITATION LIST

Patent Literature

Patent Literature 1: Japanese Patent Laid-Open No. 2000-319505
Patent Literature 2: Japanese Patent Laid-Open No. 2010-269995
Patent Literature 3: Japanese Patent Laid-Open No. 2007-112877
Patent Literature 4: Japanese Patent Laid-Open No. 10-67931
Patent Literature 5: Japanese Patent Laid-Open No. 10-204286
Patent Literature 6: National Publication of International Patent Application No. 2014-503003

SUMMARY OF INVENTION

Technical Problem

The techniques described in Patent Literature 1, Patent Literature 2, Patent Literature 3, Patent Literature 4, Patent Literature 5, and Patent Literature 6, however, cannot provide a polyamide resin composition exhibiting vibration fatigue resistance required at a high level.

The present invention has been made in order to solve the above problem, and an object thereof is to provide a polyamide resin composition excellent in durability, particularly, vibration fatigue resistance, as well as a molded body thereof.

Solution to Problem

The present inventors have made intensive studies in order to solve the above problem, and as a result, have found that the above problem is solved by a polyamide resin composition including (A) a polyamide resin, and (B) a specific glass fiber and (C) a specific copolymer, and a molded body thereof, thereby completing the present invention.

That is, the present invention provides the following.

[1]
A polyamide resin composition comprising:
(A) a polyamide resin,
(B) a glass fiber comprising a compound comprising a carboxylic anhydride-containing unsaturated vinyl monomer, the compound being on at least a part of a surface of the glass fiber, and
(C) a copolymer comprising a carboxylic anhydride-containing unsaturated vinyl monomer and having a glass transition temperature Tg of higher than 0° C.

[2]
The polyamide resin composition according to [1], wherein a grafted polyamide resin is present at an interface between the polyamide resin and the glass fiber (B) and an amount of the grafted polyamide resin is 0.15 to 2 parts by mass based on 100 parts by mass of the glass fiber (B), in the polyamide resin composition.

[3]
The polyamide resin composition according to [1] or [2], wherein a ratio of a tensile strength at 80° C. to a tensile strength at 23° C. is 70% or more.

[4]
The polyamide resin composition according to any of [1] to [3], wherein the polyamide resin in the polyamide resin composition satisfies a relationship of amount of carboxyl terminal/amount of amino terminal ≥1.

[5]
The polyamide resin composition according to any of [1] to [4], comprising the glass fiber (B) in an amount of 5 parts by mass or more and 200 parts by mass or less based on 100 parts by mass of the polyamide resin (A), and comprising the copolymer (C) in an amount of 0.01 parts by mass or more and 2 parts by mass or less based on 100 parts by mass of the polyamide resin (A).

[6]
The polyamide resin composition according to any of [1] to [5], wherein a weight average molecular weight of the copolymer (C) is 600000 or less.

[7]

The polyamide resin composition according to any of [1] to [6], wherein an acid value of the copolymer (C) is 0.1 or more.

[8]

The polyamide resin composition according to any of [1] to [7], wherein the polyamide resin (A) comprises at least one selected from the group consisting of polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), polyamide 6I (polyhexamethylene isophthalamide) and polyamide MXD6 (polymetaxylylene adipamide), and a copolymerized polyamide comprising any of them as a constituent component.

[9]

The polyamide resin composition according to any of [1] to [8], further comprising (D) a thermal stabilizer.

[10]

The polyamide resin composition according to [9], wherein the thermal stabilizer (D) comprises copper.

[11]

The polyamide resin composition according to any of [1] to [10], wherein the glass fiber (B) is substantially a chopped strand cut to 2.8 mm to 3.2 mm.

[12]

The polyamide resin composition according to any of [1] to [11], obtained by melting and kneading the polyamide resin (A) and the glass fiber (B), and thereafter adding the copolymer (C) thereto and further melting and kneading a resultant thereof.

[13]

A molded body comprising the polyamide resin composition according to any of [1] to [12].

[14]

An automobile part comprising the polyamide resin composition according to any of [1] to [13].

[15]

A method for producing a polyamide resin composition, comprising:
(a) melting and kneading (A) a polyamide resin, and (B) a glass fiber comprising a compound comprising a carboxylic anhydride-containing unsaturated vinyl monomer, the compound being on at least a part of a surface of the glass fiber, and
(b) melting and kneading (C) a copolymer comprising a carboxylic anhydride-containing unsaturated vinyl monomer and having a glass transition temperature Tg of higher than 0° C., after the (a).

Advantageous Effects of Invention

The present invention can provide a polyamide resin composition excellent in durability, particularly, vibration fatigue resistance, and a molded body thereof.

DESCRIPTION OF EMBODIMENTS

Hereinafter, an embodiment of the present invention (hereinafter, referred to as "the present embodiment") is described in detail. Herein, the present invention is not limited to the following embodiment, and various modifications can be carried out within the gist of the present invention.

[Polyamide Resin Composition]

A polyamide resin composition of the present embodiment comprises (A) a polyamide resin, (B) a glass fiber comprising a compound comprising a carboxylic anhydride-containing unsaturated vinyl monomer, the compound being on at least a part of the surface of the glass fiber, and (C) a copolymer comprising a carboxylic anhydride-containing unsaturated vinyl monomer and having a glass transition temperature Tg of higher than 0° C. The polyamide resin composition of the present embodiment is thus configured by the desired materials, and therefore can exhibit excellent durability, particularly, vibration fatigue resistance.

In the present embodiment, the glass fiber (B) is preferably contained in an amount of 5 parts by mass or more and 200 parts by mass or less based on 100 parts by mass of the polyamide resin (A). In the case of the above range, both of fluidity and outer appearance of a glass fiber-reinforced polyamide resin composition tend to be much better. From the same viewpoint, the amount is more preferably 5 parts by mass or more and 150 parts by mass or less, further preferably 15 parts by mass or more and 100 parts by mass or less.

In the present embodiment, the copolymer (C) is contained in an amount of 2 parts by mass or less based on 100 parts by mass of the polyamide resin (A). When the content of the copolymer (C) is 2 parts by mass or less, excessive crosslinking at the polyamide terminal tends to be suppressed, good fluidity and outer appearance can tend to be retained, and the effect of enhancing vibration fatigue resistance tends to be higher. Furthermore, the content of the copolymer (C) is preferably 0.01 parts by mass or more. The copolymer (C) is added in an amount of 0.01 parts by mass or more, and thus the effect of enhancing vibration fatigue resistance tends to be higher. From the same viewpoints, the amount is more preferably 0.01 parts by mass or more and 1 part by mass or less, further preferably 0.01 parts by mass or more and 0.6 parts by mass or less, further more preferably 0.01 parts by mass or more and 0.3 parts by mass or less.

In the polyamide resin composition of the present embodiment, it is particularly preferable from the above viewpoints that the glass fiber (B) be contained in an amount of 5 parts by mass or more and 200 parts by mass or less based on 100 parts by mass of the polyamide resin (A) and the copolymer (C) be contained in an amount of 0.01 parts by mass or more and 2 parts by mass or less based on 100 parts by mass of the polyamide resin (A).

In the polyamide resin composition of the present embodiment, the ratio of the tensile strength at 80° C. to the tensile strength at 23° C. is preferably 70% or more. When such a relationship between the tensile strengths is satisfied, the polyamide resin composition tends to have much better durability, particularly, vibration fatigue resistance in use under a high temperature (80° C. or higher and the melting point of the polyamide resin (A) or lower) environment. The tensile strengths at the above respective temperatures can be measured by a method described in Examples later.

Hereinafter, respective constituent elements of the polyamide resin according to the present embodiment are described in detail.

[Polyamide Resin (A)]

The "polyamide resin" means a polymer compound having a —CO—NH-(amide) bond in the main chain. In the present description, a polyamide resin as a raw material for constituting the polyamide resin composition of the present embodiment may be particularly symbolized and designated as "polyamide resin (A)". On the other hand, a polyamide resin in the polyamide resin composition of the present embodiment (namely, a polyamide resin co-existing with other constituent elements in the polyamide resin composition of the present embodiment) is not particularly symbolized and is simply designated as "polyamide resin". Examples of the polyamide resin (A) in the present embodiment include (a) a polyamide obtained by ring-opening polymerization of a lactam, (b) a polyamide obtained by self-condensation of w-aminocarboxylic acid, (c) a polyamide obtained by condensation of a diamine and a dicarboxylic acid, and a copolymerized product thereof, but are not limited thereto. For the polyamide resin (A) in the present embodiment, the above may be used singly or as a mixture of two or more.

In the case of (a) above, examples of the lactam as a monomer being a constituent component of the polyamide resin (A) may include, but not particularly limited to, pyrrolidone, caprolactam, undecalactam and dodecalactam.

In the case of (b) above, examples of the w-aminocarboxylic acid may include, but not particularly limited to, ω-aminofatty acid being a ring-opened compound obtainded by the lactam and water. Herein, the lactam or the ω-aminocarboxylic acid may be obtained by combination use and condensation of respective two or more monomers (the lactams or the w-aminocarboxylic acids).

In the case of (c) above, examples of the diamine (monomer) may include, but not particularly limited to, linear aliphatic diamines such as hexamethylenediamine, pentamethylenediamine and nonanemethylenediamine; branched aliphatic diamines such as 2-methylpentanediamine and 2-ethylhexamethylenediamine; aromatic diamines such as p-phenylenediamine, m-phenylenediamine and m-xylylenediamine; and alicyclic diamines such as cyclohexanediamine, cyclopentanediamine and cyclooctanediamine. Examples of the dicarboxylic acid (monomer) may include, but not particularly limited to, aliphatic dicarboxylic acids such as adipic acid, pimelic acid, sebacic acid and dodecanedioic acid; aromatic dicarboxylic acids such as terephthalic acid and isophthalic acid; and alicyclic dicarboxylic acids such as cyclohexanedicarboxylic acid.

The polyamide resin (A) obtained in the case of (c) above may be obtained by condensation of the diamine and the dicarboxylic acid, which are each used singly or in combinations of two or more.

The polyamide obtained by condensation of the diamine and the dicarboxylic acid is, for example, a polyamide obtained by being polymerized through dehydration condensation of an aqueous salt solution in which the diamine and the dicarboxylic acid are dissolved in equimolar amounts. The polymerization is preferably conducted by a known method with the temperature and pressure being properly adjusted.

Examples of the polyamide resin (A) in the present embodiment, obtained as described above, may include, but not particularly limited to, polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), polyamide 61 (polyhexamethylene isophthalamide), polyamide 2Me5T (poly-2-methylpentamethylene terephthalamide) and polyamide MXD6 (polymetaxylylene adipamide), and one or more polyamide resins selected from the group consisting of copolymerized polyamides including at least one of them as a constituent component.

Examples of the copolymerized polyamide may include, but not particularly limited to, a copolymerized product of hexamethylene adipamide and hexamethylene terephthalamide, a copolymerized product of hexamethylene adipamide and hexamethylene isophthalamide, and a copolymerized product of hexamethylene terephthalamide and 2-methylpentanediamine terephthalamide.

Among the polyamides, polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), polyamide 61 (polyhexamethylene isophthalamide) and polyamide MXD6 (polymetaxylylene adipamide), and a copolymerized polyamide including any of them as a constituent component are preferable, and hexamethylene adipamide (polyamide 66) and a copolymer including polyamide 66 are more preferable. The above polyamide resin (A) is used and thus the polyamide resin composition of the present embodiment tends to exhibit much better durability.

The polyamide resin (A) in the present embodiment is preferably contained in an amount of 33% by mass or more and 95% by mass or less in the polyamide resin composition. When the polyamide resin composition of the present embodiment contains the polyamide resin (A) in the above range, it tends to have much better strength, heat resistance, chemical resistance, specific gravity, and the like. From the same viewpoint, the polyamide resin (A) is more preferably contained in an amount of 50% by mass or more and 75% by mass or less in the polyamide resin composition.

In the present embodiment, the amount of the amino terminal of the polyamide resin (A) for use as a raw material is preferably 40 [mmol/kg] or more. The amount of the amino terminal of the polyamide resin (A) for use as a raw material is 40 [mmol/kg] or more, and thus, interaction with the component included in the surface of the glass fiber (B) and the copolymer (C), specifically, a chemical reaction point with a carboxylic anhydride functional group tends to increase, and a higher effect of enhancing vibration fatigue resistance tends to be achieved. Herein, the amount of the amino terminal can be adjusted by, for example, adjustment of the amount of an amine monomer or a carboxylic acid monomer to be added during polymerization, solid phase polymerization conditions, and a combination thereof. In measurement of the amount of the amino terminal (terminal group concentration), the amount can be determined by, for example, $^1$H-NMR measurement at 60° C. using a deuterosulfuric acid solvent. That is, the amount can be calculated by determining the integral values of the respective peaks corresponding to the amino group terminal and the carboxyl group terminal, which are obtained in the NMR measurement.

The relative viscosity in sulfuric acid of the polyamide resin (A) in the present embodiment is preferably 1.8 or more and 3.0 or less. When the relative viscosity is 1.8 or more, a polyamide resin composition much better in mechanical properties tends to be obtained. When the relative viscosity is 3.0 or less, a polyamide resin composition much better in fluidity and outer appearance tends to be obtained. From the same viewpoints, the relative viscosity is more preferably 2.2 or more and 2.8 or less. The relative viscosity can be adjusted by changing the pressure during polymerization. Herein, the relative viscosity can be measured by the method described in JIS K6920.

[Glass Fiber (B)]

The glass fiber (B) in the present embodiment has a compound having a carboxylic anhydride-containing unsaturated vinyl monomer on at least a part of the surface. The compound having a carboxylic anhydride-containing unsaturated vinyl monomer in the present embodiment means a polymer in which at least one component constituting the main chain is a carboxylic anhydride-containing unsaturated vinyl monomer. In the present description, the "component constituting the main chain" refers to a component constituting the main chain by a continuous reaction of an active group of the component (monomer) itself, for example, a vinyl group, to produce a multimer. In the present embodiment, the state of "having on at least a part of the surface" can be specifically achieved by, for example, coating or impregnating the surface of the glass fiber with a specific component. Whether or not the glass fiber (B) has a compound having a carboxylic anhydride-containing unsaturated vinyl monomer on at least a part of the surface can be confirmed by a known analysis method such as IR and NMR.

Specific examples of the "coating" here include, but not limited to, allowing the surface of the glass fiber to have a specific component using a known apparatus or method such as a roller type applicator, in a known glass fiber production process.

In the present embodiment, it is considered, but without any limitation to the following mechanism, that not only the copolymer (C) described later in detail is simply contained, but also the glass fiber (B) has the desired component (carboxylic anhydride-containing unsaturated vinyl monomer component) on at least a part of the surface as described above, and therefore the effects provided by adding the copolymer (C) is synergistically enhanced.

The polyamide resin composition of the present embodiment contains the glass fiber (B), and thus can exhibit excellent durability. Herein, the polyamide resin composition preferably contains the glass fiber (B) in an amount of 5 parts by mass or more and 200 parts by mass or less based on 100 parts by mass of the polyamide resin (A). The glass fiber (B) in the present embodiment can be used, for example, in the form of a glass roving for reinforcing a thermoplastic resin or in the form of a glass chopped strand for reinforcing the thermoplastic resin, but not particularly limited thereto.

The glass fiber (B) in the present embodiment is not particularly limited, and preferably has an average fiber diameter of 5 μm or more and 30 μm or less. In this case, a polyamide resin composition having much better strength and moldability tends to be obtained. The average fiber length of the glass fiber is not also particularly limited, and can be appropriately selected from the range from 0.1 mm or more to 6 mm or less in the case where the form of a chopped strand is adopted. The average fiber length is preferably 2 mm or more and 4 mm or less, more preferably 2.8 mm or more and 3.2 mm or less, from the viewpoint of enhancement in vibration fatigue resistance. That is, it can be said that the glass fiber (B) is preferably substantially a chopped strand having a length of 2.8 mm or more and 3.2 mm or less. The term "substantially" here means that the glass fiber (B) corresponds to a chopped strand having a length of 2.8 mm or more and 3.2 mm or less is contained in an amount of 95% by mass or more based on total amount of the glass fiber (B). The average fiber diameter and the average fiber length in the present description correspond to the respective averages of the values obtained by measuring diameters and lengths of 500 fibers randomly selected.

In the glass fiber (B) in the present embodiment, the surface is preferably treated with a silane coupling agent from the viewpoint of an increase in the affinity between other substance such as a resin and the glass fiber (B), for example. In addition, in the glass fiber (B) in the present embodiment, the surface is preferably treated with a sizing agent described later from the viewpoint of an increase in the affinity between other substance such as a resin and the glass fiber (B), for example. In the present embodiment, the glass fiber (B) particularly preferably has a surface treated with a silane coupling agent and coated with a sizing agent.

[Silane Coupling Agent]

Examples of the silane coupling agent may include, but not particularly limited to, aminosilanes such as γ-aminopropyltriethoxysilane, γ-aminopropyltrimethoxysilane and N-β-(aminoethyl)-γ-aminopropylmethyldimethoxysilane; mercaptosilanes such as γ-mercaptopropyltrimethoxysilane and γ-mercaptopropyltriethoxysilane; epoxysilanes; and vinylsilanes. One or more selected from the above-mentioned components are preferable, and aminosilanes are more preferable.

[Sizing Agent]

The sizing agent is used for coating or the like of the surface of the glass fiber (B) for the purpose of playing a role in, for example, bundling the glass fiber (B) or increasing the affinity between the other substance such as a resin and the glass fiber (B). There is not any particular limitation in the above coating, and a method described in "Method for preparing glass fiber (B)", described later, can be adopted.

Herein, the sizing agent preferably contains a compound having a carboxylic anhydride-containing unsaturated vinyl monomer from the viewpoint of the enhancement in vibration fatigue resistance of the polyamide resin composition and the molded body thereof. That is, the glass fiber (B) may have the compound having a carboxylic anhydride-containing unsaturated vinyl monomer in the present embodiment described above as the sizing agent on at least a part of the surface of the glass fiber.

The sizing agent may further include a polymer in which at least one component constituting the main chain is an unsaturated monocarboxylic acid and/or a derivative thereof, from the viewpoint of further enhancement in vibration fatigue resistance of the polyamide resin composition and the molded body thereof in the present embodiment. That is, in the present embodiment, the glass fiber (B) may further have the polymer in which at least one component for forming the main chain is an unsaturated monocarboxylic acid and/or a derivative thereof, on at least a part of the surface of the glass fiber.

In the present description, the "unsaturated monocarboxylic acid" refers to a compound having one or more carbon-carbon double bonds and one carboxyl group in the molecule. Both of cyclic and acyclic unsaturated monocarboxylic acids are suitable, and, in particular, an acyclic unsaturated monocarboxylic acid is preferable.

The "derivative of the unsaturated monocarboxylic acid" described above refers to the unsaturated monocarboxylic acid to which a functional group is introduced. Examples thereof include, but not particularly limited to, those in which a carbonyl group is esterified by an alcohol such as methanol, ethanol and propanol.

The sizing agent may contain a polyurethane resin.

The polyurethane resin is not particularly limited as long as it is generally used as a glass fiber sizing agent. For example, those synthesized from an isocyanate such as m-xylylene diisocyanate (XDD), 4,4'-methylenebis(cyclohexyl isocyanate) (HMDI) and isophorone diisocyanate (IPDI), and a polyester-based or polyether-based diol can be suitably used.

The sizing agent may be prepared in any form of an aqueous solution, a colloidal dispersion, and an emulsion using an emulsifier, depending on the usage mode.

[Method for Preparing Glass Fiber (B)]

When the glass fiber (B) is prepared in the form of a glass roving, it can be continuously obtained by coating the surface of the glass roving with the sizing agent using a known method such as a roller type applicator to provide a strand and drying the strand, in a known glass fiber production process. When the glass fiber (B) is prepared in the form of a glass chopped strand, it can be obtained by cutting the glass roving to a predetermined length. The strand may be dried after the cutting step, or may be dried and then cut.

In the present embodiment, the sizing agent is preferably coated (adhered) such that a solid content thereof is 0.2% by mass or more and 3% by mass or less, more preferably 0.3% by mass or more and 2% by mass or less, based on 100% by mass of the glass fiber (B). The adhesion amount of the sizing agent is preferably 0.2% by mass or more as a solid content based on 100% by mass of the glass fiber (B) from the viewpoint of maintaining sizing of the glass fiber (B). On the other hand, the adhesion amount is preferably 3% by mass or less from the viewpoint of enhancement in heat stability of a glass fiber-reinforced thermoplastic resin composition described later. Herein, the adhesion amount can be measured by the same method as the method described in Examples described later.

[Copolymer (C)]

The polyamide resin composition of the present embodiment contains the copolymer (C) including a carboxylic anhydride-containing unsaturated vinyl monomer and having a glass transition temperature Tg of higher than 0° C. The phrase "including a carboxylic anhydride-containing unsaturated vinyl monomer" means that at least one component constituting the main chain in the copolymer (C) includes a carboxylic anhydride-containing unsaturated vinyl monomer.

The polyamide resin composition of the present embodiment contains the copolymer (C) including a carboxylic anhydride-containing unsaturated vinyl monomer and having a glass transition temperature (Tg) of higher than 0° C., and thus vibration fatigue resistance is enhanced. In addition, the Tg is preferably higher than 60° C. When the Tg is higher than 60° C., a higher effect of enhancing vibration fatigue resistance tends to be achieved. The Tg is more preferably higher than 60° C. and lower than 200° C. When the Tg is lower than 200° C., a higher effect of enhancing vibration fatigue resistance tends to be achieved. On the other hand, if the Tg is 0° C. or lower, the effect of enhancing vibration fatigue resistance cannot be sufficiently achieved. The Tg can be measured at a rate of temperature rise of 20° C./min using Diamond-DSC manufactured by PerkinElmer Co., Ltd. according to JIS-K7121.

The copolymer (C) in the present embodiment is not particularly limited as long as it includes a carboxylic anhydride-containing unsaturated vinyl monomer and has a glass transition temperature Tg of higher than 0° C. For example, an ethylene-maleic anhydride copolymer, a propylene-maleic anhydride copolymer, a butadiene-maleic anhydride copolymer, a styrene-maleic anhydride copolymer, an acrylonitrile-maleic anhydride copolymer, or the like can be adopted. In particular, a copolymer including no aromatic derivative monomer as a main component (examples thereof include, but not limited to, an ethylene-maleic anhydride copolymer, a propylene-maleic anhydride copolymer, a butadiene-maleic anhydride copolymer and an acrylonitrile-maleic anhydride copolymer) is preferably adopted in terms of color tone, and an ethylene-maleic anhydride copolymer is preferably adopted from the viewpoint of enhancing vibration fatigue resistance.

The weight average molecular weight of the copolymer (C) in the present embodiment is preferably 600000 or less, more preferably 10000 or more and 500000 or less, most preferably 60000 or more and 400000 or less. When the weight average molecular weight is 10000 or more, heat stability tends to be enhanced, and decomposition and the like in subjecting of the polyamide resin composition to an extrusion step tend to be suppressed. In addition, when the weight average molecular weight is 600000 or less, dispersibility of the copolymer (C) in polyamide tends to be enhanced, and vibration fatigue resistance of the polyamide resin composition tends to be enhanced. When the weight average molecular weight is 400000 or less, a polyamide resin composition having much better vibration fatigue resistance can tend to be obtained. In the present description, the weight average molecular weight can be determined by gel permeation chromatography (GPC).

The acid value of the copolymer (C) in the present embodiment is preferably 0.1 or more, further preferably 0.2 or more, and it is preferably 0.5 or less. When the copolymer (C) has the above acid value, a higher effect of enhancing vibration fatigue resistance tends to be achieved. Herein, the acid value in the present description can be determined by measuring the number of milligrams of potassium hydroxide required for neutralization of the acid present in 1 g of the copolymer (C) according to JIS K0070.

[Thermal Stabilizer (D)]

The polyamide resin composition of the present embodiment may include a thermal stabilizer (D). The "thermal stabilizer" refers to a stabilizer to be added for suppression of degradation due to heat, and examples thereof include a phenol-based thermal stabilizer, a phosphorus-based thermal stabilizer, an amine-based thermal stabilizer and a copper-based thermal stabilizer. That is, the polyamide resin composition of the present embodiment tends to further suppress degradation due to heat when containing the thermal stabilizer (D). In the present embodiment, the content of the thermal stabilizer (D) is not particularly limited, and the thermal stabilizer (D) is preferably contained in an amount in the range from 0.001 parts by mass to 5 parts by mass from the viewpoints of effective suppression of degradation due to heat, prevention of coloring, retention of mechanical properties, and the like.

The above "phenol-based thermal stabilizer" refers to a molecule including a phenol group, and examples thereof include, but not limited to, Irganox (registered trademark) 1098 (produced by BASF SE).

The above "phosphorus-based thermal stabilizer" refers to a molecule including elemental phosphorus, and examples thereof include, but not limited to, PEP (registered trademark) 36 (produced by ADEKA Corporation).

The above "amine-based thermal stabilizer" refers to a molecule including an amine, and examples thereof include, but not limited to, Nyrostab (registered trademark) S-EED (produced by Clariant).

The above "copper-based thermal stabilizer" refers to a stabilizer including a mixture of a copper salt with an alkali metal halide and/or an alkali earth metal halide. Specific examples of the copper-based thermal stabilizer include, but not limited to, a mixture of copper iodide (I) with potassium iodide and a mixture of copper iodide (I) with potassium bromide. The thermal stabilizer (D) preferably contains copper from the viewpoint of enhancing vibration fatigue resistance. That is, the polyamide resin composition of the present embodiment preferably contains the copper-based thermal stabilizer.

[Other Component(s) that can be Included in Polyamide Resin Composition]

Other component(s) other than the above components may be, if necessary, added as long as the effects of the present embodiment is not impaired. The other component(s) is not particularly limited. For example, an inorganic filler other than a glass fiber, an antioxidant, an ultraviolet absorber, a thermal stabilizer, a photo-degradation inhibitor, a plasticizer, a lubricant, a release agent, a nucleating agent, a flame retardant, a colorant, a dye, and a pigment may be added as the other component(s), and other thermoplastic resins may be mixed. Since such other components have a property largely different from each other, respective suitable contents thereof, which do not almost impair the effects of the present embodiment, are varied and can be appropriately set.

[Method for Producing Polyamide Resin Composition]

In the present embodiment, the method for producing the polyamide resin composition is not particularly limited, and examples thereof may include a method in which the polyamide resin (A), the glass fiber (B), the copolymer (C) and other desirable component(s) are mixed, and kneaded using a predetermined monoaxial or multiaxial extruder. Specifically, when a glass chopped strand is used as the glass fiber (B), a method is preferably used in which a biaxial extruder provided with an upstream side feed port and a downstream side feed port is used and a thermoplastic resin is fed through the upstream side feed port and molten, and thereafter the glass chopped strand is fed through the downstream side feed port and the resultant is molten and kneaded. Also when a glass roving is used, compositing can be made by a known method.

In the present embodiment, the method for producing the polyamide resin composition is more preferably a method in which the polyamide resin (A) and the glass fiber (B) are molten and kneaded, and thereafter the copolymer (C) is added thereto and the resultant is further molten and kneaded. That is, a preferable method for producing the polyamide resin composition in the present embodiment includes (a) melting and kneading the polyamide resin (A) and the glass fiber (B), and (b) adding the copolymer (C) thereto and further melting and kneading the resultant, after the (a). Specifically, for example, a biaxial extruder provided with one upstream side feed port and two downstream side feed ports (a feed port located more upstream side is defined as a first downstream side feed port, and a feed port located more downstream side is defined as a second downstream side feed port) is more preferably used. When the biaxial extruder is used, more preferably, the polyamide resin (A), and, if necessary, the thermal stabilizer (D) and other additive(s) are fed through the upstream side feed port, a glass chopped strand for use as the glass fiber (B) is fed through the first downstream side feed port, and the copolymer (C) is fed through the second downstream side feed port.

When the above production method is used, the method is particularly preferable from the viewpoints that the polyamide resin (A) and the glass fiber (B) are mixed in advance and therefore sufficiently interact with each other, and that the copolymer (C) is then added and therefore the effect of enhancing vibration fatigue resistance by addition of the copolymer (C) is achieved without impairing the interaction between the polyamide resin (A) and the glass fiber (B). Accordingly, the above preferable production method allows vibration fatigue resistance of the resulting polyamide resin composition to be more enhanced.

[Grafted Polyamide Resin]

A "grafted polyamide resin" is present at the interface between the polyamide resin and the glass fiber (B) in the polyamide resin composition of the present embodiment, and is formed at the interface between the polyamide resin and the glass fiber by melting and kneading the polyamide resin and the glass fiber. The amount of the grafted polyamide resin (hereinafter, also referred to as the amount to be grafted) can be adjusted by extrusion conditions (temperature, screw design, and the like), the polyamide resin (molecular weight and terminal group concentrations), the surface treatment of the glass fiber, and the like. In the present embodiment, the above adjustment method is not limited.

Specific examples of the procedure of increasing the amount of the "grafted polyamide resin" include, but not limited to, a procedure in which the glass fiber (B) having a proper amount of the compound having a carboxylic anhydride-containing unsaturated vinyl monomer on at least a part of the surface is molten and kneaded with the polyamide resin (A) before the copolymer (C) is added.

When the amount of the "grafted polyamide resin" is larger, vibration fatigue resistance and mechanical properties at high temperatures (80° C. or higher and the melting point of the polyamide resin (A) or lower) tend to be more enhanced.

The grafted polyamide resin present at the interface between the polyamide resin and the glass fiber in the present embodiment refers to an organic substance which, upon immersion of a polyamide resin pellet or a molded product in a solvent of the polyamide resin in order to elute the polyamide resin to precipitate the glass fiber, is not eluted in the solvent and remains on the surface of the glass fiber, and which includes the polyamide resin as a main component, and the grafted polyamide resin can be confirmed by the infrared absorption spectrum and/or the pyrolysis gas chromatography analysis. Herein, the phrase "including the polyamide resin as a main component" means that the presence of a polyamide resin component is clearly confirmed in the respective analysis procedures.

A glass fiber-reinforced polyamide 66 resin is taken as a specific example and described: first, a glass fiber-reinforced polyamide 66 resin pellet or a molded product is mixed with phenol in order to separate the glass fiber and a polyamide 66 resin not grafted therein; and a polyamide 66-phenol solution portion is removed, the remaining glass fiber portion is washed with phenol several times until no polyamide 66 is eluted, then washed with ethanol several times in order to remove phenol, and thereafter ethanol is removed by drying.

A glass fiber grafted with the organic substance is thus obtained. Such a glass fiber taken out from the resin pellet or the molded product and grafted with the organic substance is also referred to as "grafted glass fiber" hereinafter. This organic substance subjected to grafting can be confirmed from the results of the infrared absorption spectrum and/or the pyrolysis gas chromatograph/mass spectrum analysis to be one including a polyamide 66 resin as a main component.

The amount of the grafted polyamide resin (amount to be grafted) present at the interface between the polyamide resin and the glass fiber in the present embodiment can be determined from the amount of mass reduction obtained by subjecting the grafted glass fiber taken out as described above to measurement according to JIS R3420 (ignition loss). The amount of the grafted polyamide resin present at the interface is preferably 0.15 to 2 parts by mass, more preferably 0.2 to 2 parts by mass, further preferably 0.2 to 1.7 parts by mass, based on 100 parts by mass of the glass fiber. When the amount to be grafted is 0.15 parts by mass or more, the surface of the glass fiber tends to be sufficiently covered, and vibration fatigue resistance of the molded product obtained from the pellet tends to be sufficiently exhibited. Moreover, when the amount is 2 parts by mass or less, a reduction in melting fluidity or an increase in pressure in injection molding tends to be prevented while the effects of the present embodiment are ensured.

In the present embodiment, the polyamide resin in the polyamide composition preferably satisfies a relationship of the amount of the carboxyl terminal/the amount of the amino terminal≥1. In other words, the polyamide resin in a state of coexisting with other constituent components in the polyamide resin composition of the present embodiment preferably satisfies the above relationship. The polyamide resin composition of the present embodiment contains the copolymer (C) including a carboxylic anhydride-containing unsaturated vinyl monomer and having a glass transition temperature Tg of higher than 0° C., and the glass fiber (B) having a compound having a carboxylic anhydride-containing unsaturated vinyl monomer on at least a part of the surface of the glass fiber, and the carboxylic anhydride functional groups included therein can each react with the amino terminal of the polyamide resin (A) as a raw material. The carboxylic anhydride functional groups each further react with the amino terminal of the polyamide resin (A) as a raw material, and thus a higher effect of enhancing vibration fatigue resistance of the present embodiment tends to be achieved. Thus, the reaction with the carboxylic anhydride functional groups decreases the amino terminal of the polyamide resin. The carboxylic anhydride functional groups each react with the amino terminal of the polyamide resin until the polyamide resin composition satisfies the amount of the carboxyl terminal/the amount of the amino terminal ≥1, and thus a higher effect of enhancing vibration fatigue resistance of the present embodiment tends to be achieved.

The amount of the carboxyl terminal (terminal group concentration) and the amount of the amino terminal (terminal group concentration) can be determined by, for example, $^1$H-NMR measurement at 60° C. using a deuterosulfuric acid solvent. That is, the amounts can be calculated by determining the integral values of the respective peaks corresponding to the amino group terminal and the carboxyl group terminal, which are obtained in the NMR measurement.

[Molded Body Using Polyamide Resin Composition]

A molded body of the present embodiment includes the polyamide resin composition according to the above embodiment. Examples of the molded body may include, but not particularly limited to, a molded body for various parts by injection molding of the polyamide resin composition according to the above embodiment. Examples of applications of the molded body of the present embodiment may include, but not particularly limited to, various parts for automobiles, mechanical industries, electrical and electronics, industrial materials, manufacturing materials, daily necessaries/household products, and the like. The molded body of the present embodiment can impart excellent vibration fatigue resistance to the above various parts.

The polyamide resin composition according to the present embodiment is suitable for automobile parts because of being excellent in vibration fatigue resistance.

EXAMPLES

Hereinafter, the present embodiment is more specifically described based on Examples and Comparative Examples, but the present embodiment is not limited to only these Examples. Herein, measurement methods for evaluating samples according to Examples and Comparative Examples were as follows.

<Measurement Methods>

[Relative Viscosity (ηr) in 98% Sulfuric Acid]

The relative viscosity (ηr) in 98% sulfuric acid of the polyamide resin (A) in each of Examples and Comparative Examples described later (hereinafter, simply also referred to as "each Example") was measured according to JISK6920.

[Terminal Group Concentrations]

The terminal group concentrations were determined by $^1$H-NMR measurement at 60° C. using a deuterosulfuric acid solvent. For the measurement apparatus here, ECA 500 manufactured by JEOL Ltd. was used. That is, the terminal group concentrations were calculated from the integral values of the respective peaks corresponding to the amino group terminal and the carboxyl group terminal of the polyamide resin (A) in each Example.

[Weight Average Molecular Weight]

The weight average molecular weight of the copolymer (C) in each Example was determined by measurement using GPC (gel permeation chromatography).

[Tg]

The Tg of the copolymer (C) in each Example was determined by measurement at a rate of temperature rise of 20° C./min using Diamond-DSC manufactured by PerkinElmer Co., Ltd. according to JIS-K7121.

[Acid Value]

The acid value of the copolymer (C) in each Example was determined by measuring the number of milligrams of potassium hydroxide required for neutralization of the acid present in 1 g of the copolymer (C) according to JIS K0070.

[Adhesion Amount of Sizing Agent]

The thermal weight loss of the glass fiber was determined by a thermogravimetric analysis (TGA) apparatus in each Example, and the amount of the sizing agent to be adhered to the glass fiber was measured. TGA-50 (manufactured by Shimadzu Corporation) was used for the TGA apparatus, and the temperature conditions were as follows: the temperature was raised from 30° C. to 550° C. at a rate of temperature rise of 20° C./min, and was kept at 550° C. for 1 hour.

[Vibration Fatigue Resistance]

In order to mold a pellet of the polyamide resin composition obtained in each Example, in an injection molding machine (PS-40E: produced by Nissei Plastic Industrial Co., Ltd.), the injection and pressure-keeping time was set to be 10 seconds and the cooling time was set to be 7 seconds, and the mold temperature and the cylinder temperature were each set as described in Examples later. A JIS K7139 small-sized ISO test piece (3 mm in thickness) thus made according to ISO 294-1 was subjected to a vibration fatigue resistance test using Shimadzu Servopulser (EHF-FV10KN-10LA) manufactured by Shimadzu Corporation. The conditions here were as follows: frequency: 20 Hz, wave shape: sine wave, temperature: 120° C., stress ratio: 0.1, and distance between chucks: 30 mm. Furthermore, the following two measurement conditions were set.

Measurement condition 1: when the stress applied to a specimen was set to be 76 MPa, the number of vibrations until fracture of the specimen was determined.

Measurement condition 2: when the stress applied to a specimen was set to be 66 MPa, the number of vibrations until fracture of the specimen was determined.

[Tensile Strength at Each of 23° C., 80° C. And 120° C.]

In order to mold a pellet of the polyamide resin composition obtained in each Example, in an injection molding machine (PS-40E: produced by Nissei Plastic Industrial Co., Ltd.), the injection and pressure-keeping time was set to be 25 seconds and the cooling time was set to be 15 seconds, and the mold temperature and the cylinder temperature were each set as described in Examples later. A molded piece of a multi-purpose test piece A type was formed according to ISO 3167. The multi-purpose test piece (A type) was subjected to a tensile test at 23° C., 80° C. or 120° C. at a tensile rate of 5 mm/min according to ISO 527 to measure the tensile strength. Herein, the tensile strength was defined as the strength at fracture. For the measurement apparatus here, Autograph AG-I manufactured by Shimadzu Corporation was used.

[Evaluation of Color Tone]

The b value of the test piece in each Example was measured by the reflection method using a colorimeter ZE-2000 manufactured by Nippon Denshoku Industries Co., Ltd.

[Charpy Notched Impact Strength]

Measurement of the Charpy impact strength of the molded piece (notched) corresponding to each Example was performed according to JIS K7111-1.

[Bending Strength]

In order to mold a pellet of the polyamide resin composition obtained in each Example, in an injection molding machine (PS-40E: produced by Nissei Plastic Industrial Co., Ltd.), the injection and pressure-keeping time was set to be 25 seconds and the cooling time was set to be 15 seconds, and the mold temperature and the cylinder temperature were each set as described in Examples later. A molded piece of a multi-purpose test piece A type was thus formed according to ISO 3167. The multi-purpose test piece (A type) was subjected to measurement of the bending strength of the molded piece corresponding to each Example at 23° C. according to JIS K7171.

[Tensile Strength after Water Absorption]

A molded piece of a multi-purpose test piece (A type) was formed from a pellet of a polyamide resin composition produced in each of Examples and Comparative Examples described later by using an injection molding machine (PS-40E: produced by Nissei Plastic Industrial Co., Ltd.) according to ISO 3167. Here, the injection and pressure-keeping time was set to be 25 seconds and the cooling time was set to be 15 seconds. The mold temperature and the cylinder temperature were set to be temperatures described in Production Example of polyamide resin (A) described later.

The multi-purpose test piece (A type) formed as described above was completely immersed in distilled water and subjected to water absorption at 80° C. for 48 hours. Thereafter, the test piece was cooled at 23° C. for 24 hours or more, and then taken out from distilled water and subjected to a tensile test at a tensile rate of 5 mm/min according to ISO 527 to measure each tensile strength (MPa). This procedure was used to determine the tensile strength after water absorption.

[Smoothness of Outer Appearance]

The smoothness of the outer appearance was visually evaluated. Those having a better outer appearance were sequentially rated as "Excellent", "Good" and "Poor".

[Tensile Strength after Thermal Aging at 120° C. For 5000 Hours]

A molded piece of a multi-purpose test piece (A type) was formed from a pellet of a polyamide resin composition produced in each of Examples and Comparative Examples described later by using an injection molding machine (PS-40E: produced by Nissei Plastic Industrial Co., Ltd.) according to ISO 3167. Here, the injection and pressure-keeping time was set to be 25 seconds and the cooling time was set to be 15 seconds. The mold temperature and the cylinder temperature were set to be temperatures described in Production Example of polyamide resin (A) described later.

The multi-purpose test piece (A type) formed as described above was thermally aged in a hot air circulating oven at 120° C. After a lapse of 5000 hours, the test piece was taken out from the oven and cooled at 23° C. for 24 hours, and thereafter subjected to a tensile test at a tensile rate of 5 ram/min according to ISO 527 to measure each tensile strength (MPa).

[Tensile Strength Retention Rate after Thermal Aging at 120° C. For 5000 Hours]

The tensile strength retention rate after thermal aging at 120° C. for 5000 hours was calculated by the following expression.

Tensile strength retention rate after thermal aging at 120° C. for 5000 hours=(Tensile strength after thermal aging at 120° C. for 5000 hours/Tensile strength at 23° C.)×100[%]

[Amount of Grafted Polyamide Resin]

About 5 g of a polyamide resin pellet or a molded product thereof was mixed with 100 mL of 90% phenol (stirring at 40° C. for 2 hours). This mixture was left to stand still to thereby allow a glass fiber portion to be precipitated, removing a polyamide-phenol solution as the supernatant. To the remaining glass fiber portion was added 100 mL of 90% phenol to wash the glass fiber portion (stirring at 40° C. for 2 hours). After washing, the resultant was left to stand still to thereby allow the glass fiber portion to be precipitated, removing the solution as the supernatant. This operation was repeated three times. Next, 100 mL of 99.5% ethanol was added to remove phenol (stirring at 40° C. for 2 hours). Thereafter, the resultant was left to stand still to thereby allow the glass fiber portion to be precipitated, removing the solution as the supernatant. This operation was repeated three times, and thereafter drying was performed by a nitrogen flow dryer at 80° C. for over two days and nights in order to remove ethanol.

The thus obtained glass fiber, to which the grafted polyamide resin was adhered, was subjected to measurement according to JIS R3420 to determine the amount of the grafted polyamide resin. That is, 1 g or more of the glass fiber, to which the grafted polyamide resin was adhered, was taken and the mass thereof was measured. Next, the glass fiber was dried at 110±5° C. for 1 hour or more, and thereafter placed in a desiccator to be cooled to room temperature, and the mass (m1) thereof was measured. This was heated in an electric furnace kept at 625±20° C. until the amount thereof was constant (15 minutes), and then taken out and placed in a desiccator to be cooled to room temperature, and the mass (m2) thereof was measured. Next, the ignition loss (part(s) by mass) was calculated according to the following expression, and the amount of the grafted polyamide resin (part(s) by mass per 100 parts by mass of glass fiber) was determined.

Amount of grafted polyamide resin={(m1−m2)/m2}×100

<Raw materials>

[Polyamide Resin A-1 (PA66)]

30 kg of an aqueous solution of an equimolar salt of 50% by mass of hexamethylenediamine and adipic acid was prepared, and sufficiently stirred. The aqueous solution of raw materials for polyamide 66 was charged into a 70-L autoclave having a stirring apparatus and having a draining nozzle at the lower portion thereof. Thereafter, stirring was sufficiently performed at a temperature of 50° C. Next, the atmosphere was replaced with nitrogen, and thereafter the temperature was raised from 50° C. to about 270° C. with stirring. Here, the heating was continued for about 1 hour while water was removed to the outside of the system so that the pressure in the autoclave was close to about 1.77 MPa as the gauge pressure, but was not 1.77 MPa or more. Thereafter, the pressure was dropped to the atmosphere pressure over about 1 hour and further kept at about 270° C. at the atmosphere pressure for about 1 hour, and thereafter stirring was stopped. A polymer was discharged in a strand shape through the nozzle at the lower portion, and water-cooled and cut to provide a pellet.

The relative viscosity in 98% sulfuric acid of polyamide resin A-1 was 2.8. In addition, the amino terminal group concentration was 46 µmol/g and the carboxyl terminal group concentration was 72 µmol/g. That is, the ratio of amino terminal group concentration/carboxyl terminal group concentration was 0.64. Herein, in molding of polyamide resin A-1, the mold temperature was set to be 80° C. and the cylinder temperature was set to be 290° C.

[Polyamide Resin A-2 (PA66)]

Polyamide resin A-2 was prepared by the same preparation method as that for polyamide resin A-1 except that 900 g of adipic acid was additionally added to the aqueous solution of raw materials. The relative viscosity in 98% sulfuric acid of polyamide resin A-2 was 2.2. In addition, the amino terminal group concentration was 33 µmol/g and the carboxyl terminal group concentration was 107 µmol/g. That is, the ratio of amino terminal group concentration/carboxyl terminal group concentration was 0.30. Herein, in molding of polyamide resin A-2, the mold temperature was set to be 80° C. and the cylinder temperature was set to be 290° C.

[Polyamide Resin A-3 (PA66)]

Polyamide resin A-3 was prepared by the same preparation method as in polyamide resin A-1 except that 900 g of hexamethylenediamine was additionally added to the aqueous solution of raw materials. The relative viscosity in 98% sulfuric acid of polyamide resin A-3 was 2.4. In addition, the amino terminal group concentration was 78 µmol/g and the carboxyl terminal group concentration was 52 µmol/g. That is, the ratio of amino terminal group concentration/carboxyl terminal group concentration was 1.50. Herein, in molding of polyamide resin A-3, the mold temperature was set to be 80° C. and the cylinder temperature was set to be 290° C.

[Polyamide Resin A-4 (PA66)]

The pellet of polyamide resin A-1 was placed in a container equipped with a stirrer and subjected to replacement with nitrogen, and thereafter solid phase polymerization was performed with stirring at 210° C. for 15 hours. The relative viscosity in 98% sulfuric acid of polyamide resin A-4 was 3.8. In addition, the amino terminal group concentration was 20 µmol/g and the carboxyl terminal group concentration was 52 µmol/g. That is, the ratio of amino terminal group concentration/carboxyl terminal group concentration was 0.38. Herein, in molding of polyamide resin A-4, the mold temperature was set to be 80° C. and the cylinder temperature was set to be 290° C.

[Polyamide Resin A-5 (PA66/6T)]

PA66/6T was prepared according to Production Example of National Publication of International Patent Application No. 2013-501094. The relative viscosity in 98% sulfuric acid of polyamide resin A-4 was 2.9. In addition, the amino terminal group concentration was 42 µmol/g and the carboxyl terminal group concentration was 65 µmol/g. That is, the ratio of amino terminal group concentration/carboxyl terminal group concentration was 0.64. Herein, in molding of polyamide resin A-4, the mold temperature was set to be 80° C. and the cylinder temperature was set to be 290° C.

[Polyamide Resin A-6 (PA9T)]

PA9T was prepared according to Production Example of Japanese Patent Laid-Open No. 2013-40346. The relative viscosity in 98% sulfuric acid of polyamide resin A-6 was 2.9. In addition, the amino terminal group concentration was 42 µmol/g and the carboxyl terminal group concentration was 52 µmol/g. That is, the ratio of amino terminal group concentration/carboxyl terminal group concentration was 0.80. Herein, in molding of polyamide resin A-6, the mold temperature was set to be 120° C. and the cylinder temperature was set to be 330° C.

[Polyamide Resin A-7 (PA610)]

PA610 was prepared according to Production Example of Japanese Patent Laid-Open No. 2011-148997. The relative viscosity in 98% sulfuric acid of polyamide resin A-5 was 2.3. In addition, the amino terminal group concentration was 58 µmol/g and the carboxyl terminal group concentration was 79 µmol/g. That is, the ratio of amino terminal group concentration/carboxyl terminal group concentration was 0.73. Herein, in molding of polyamide resin A-5, the mold temperature was set to be 80° C. and the cylinder temperature was set to be 260° C.

[Glass Fiber B-1]

Dilution with water was performed so as to provide, in terms of a solid content, 2% by mass of a polyurethane resin (trade name: Bondic (registered trademark) 1050, aqueous solution having a solid content of 50% by mass (produced by DIC Corporation)), 8% by mass of ethylene-maleic anhydride copolymer C-1 described later, 0.6% by mass of γ-aminopropyltriethoxysilane (trade name: KBE-903 (produced by Shin-Etsu Chemical Co., Ltd.)) and 0.1% by mass of a lubricant [trade name: carnauba wax (produced by S. Kato & Co.)], and the total mass was adjusted to be 100% by mass to provide a glass fiber sizing agent.

The above glass fiber sizing agent was allowed to be adhered to a glass fiber melt-spun, having an average diameter of 10 µm. That is, the glass fiber sizing agent was applied to the glass fiber being wound on a rotation drum by using an applicator disposed at a predetermined position. Next, this was dried to provide a glass fiber bundle roving (glass roving) surface-treated with the glass fiber sizing agent. Here, the glass fiber was made so as to be a bundle of 1,000 fibers. The adhesion amount of the glass fiber sizing agent was 0.6% by mass. This was cut to 3 mm in length to provide a glass chopped strand.

[Glass Fiber B-2]

Dilution with water was performed so as to provide, in terms of a solid content, 2% by mass of a polyurethane resin (trade name: Bondic (registered trademark) 1050, aqueous solution having a solid content of 50% by mass (produced by DIC Corporation)), 4% by mass of an ethylene-maleic anhydride copolymer (produced by Polysciences Inc.), 4% by mass of polyethyl acrylate (produced by Thermo Fisher Scientific K.K.), 0.6% by mass of γ-aminopropyltriethoxysilane (trade name: KBE-903 (produced by Shin-Etsu Chemical Co., Ltd.)) and 0.1% by mass of a lubricant (trade name: carnauba wax (produced by S. Kato & Co.)), and the total mass was adjusted to be 100% by mass to provide a glass fiber sizing agent. Glass fiber B-2 was obtained in the same manner as in glass fiber B-1 except that the glass fiber sizing agent as mentioned above was used. The adhesion amount of the glass fiber sizing agent was 0.6% by mass.

[Glass Fiber B-3]

Dilution with water was performed so as to provide, in terms of a solid content, 2% by mass of a polyurethane resin (trade name: Bondic (registered trademark) 1050, aqueous solution having a solid content of 50% by mass (produced by DIC Corporation)), 0.6% by mass of γ-aminopropyltriethoxysilane (trade name: KBE-903 (produced by Shin-Etsu Chemical Co., Ltd.)) and 0.1% by mass of a lubricant (trade name: carnauba wax (produced by S. Kato & Co.)), and the total mass was adjusted to be 100% by mass to provide a glass fiber sizing agent. Glass fiber B-3 was obtained in the same manner as in glass fiber B-1 except that the glass fiber sizing agent as mentioned above was used. The adhesion amount of the glass fiber sizing agent was 0.6% by mass.

[Glass Fiber B-4]

By the same method as in glass fiber B-1, a glass fiber having an average diameter of 7 μm was prepared and used.

[Glass Fiber B-5]

By the same method as in glass fiber B-1, a glass fiber having an average diameter of 13 μm was prepared and used.

[Glass Fiber B-6]

Dilution with water was performed so as to provide, in terms of a solid content, 2% by mass of a polyurethane resin (trade name: Bondic (registered trademark) 1050, aqueous solution having a solid content of 50% by mass (produced by DIC Corporation)), 8% by mass of ethylene-maleic anhydride copolymer C-1 described later, 0.6% by mass of γ-aminopropyltriethoxysilane (trade name: KBE-903 (produced by Shin-Etsu Chemical Co., Ltd.)) and 0.1% by mass of a lubricant [trade name: carnauba wax (produced by S. Kato & Co.)], and the total mass was adjusted to be 100% by mass to provide a glass fiber sizing agent.

The above glass fiber sizing agent was allowed to be adhered to a glass fiber melt-spun, having an average diameter of 10 μm. That is, the glass fiber sizing agent was applied to the glass fiber being wound on a rotation drum by using an applicator disposed at a predetermined position. Next, this was dried to provide a glass fiber bundle roving (glass roving) surface-treated with the glass fiber sizing agent. Here, the glass fiber was made so as to be a bundle of 1,000 fibers. The adhesion amount of the glass fiber sizing agent was 0.6% by mass. This was cut to 4.5 mm in length to provide a glass chopped strand.

[Ethylene-Maleic Anhydride Copolymer C-1]

An ethylene-maleic anhydride copolymer, having a weight average molecular weight of 60000, a Tg of 150° C. and an acid value of 0.28, was used.

[Styrene-Maleic Anhydride Copolymer C-2]

A styrene-maleic anhydride copolymer, having a weight average molecular weight of 60000, a Tg of 250° C. and an acid value of 0.1, was used.

[Ethylene-Maleic Anhydride-Containing Copolymer C-3]

An ethylene-maleic anhydride-containing copolymer, having a weight average molecular weight of 60000, a Tg of 60° C. and an acid value of 0.2, was used.

[Ethylene-Maleic Anhydride-Containing Copolymer C-4]

An ethylene-maleic anhydride-containing copolymer, having a weight average molecular weight of 60000, a Tg of −60° C. and an acid value of 0.05, was used.

[Ethylene-Maleic Anhydride Copolymer C-5]

An ethylene-maleic anhydride copolymer, having a weight average molecular weight of 150000, a Tg of 150° C. and an acid value of 0.28, was used.

[Ethylene-Maleic Anhydride Copolymer C-6]

An ethylene-maleic anhydride copolymer, having a weight average molecular weight of 400000, a Tg of 150° C. and an acid value of 0.28, was used.

[Thermal Stabilizer D-1]

Copper-based thermal stabilizer, being a mixture of 100 g of copper iodide (CuI) (produced by Wako Pure Chemical Industries, Ltd., trade name: copper iodide (I)) and 440 g of potassium iodide (KI) (produced by Wako Pure Chemical Industries, Ltd., trade name: potassium iodide), was used.

[Thermal Stabilizer D-2]

Copper-based thermal stabilizer, being a mixture of 100 g of copper iodide (CuI) (produced by Wako Pure Chemical Industries, Ltd., trade name: copper iodide (I)) and 315 g of potassium bromide (KBr) (produced by Wako Pure Chemical Industries, Ltd., trade name: potassium bromide), was used.

[Thermal Stabilizer D-3]

Irganox (registered trademark) 1098 (produced by BASF SE) was used.

Example 1

A biaxial extruder (ZSK-26MC: manufactured by Coperion GmbH (Germany)) was used as an extruder. This biaxial extruder had an upstream side feed port in the first barrel from the upstream side, had a first downstream side feed port in the sixth barrel from the upstream side, and had a second downstream side feed port in the eighth barrel from the upstream side. Then, the L/D (cylinder length of extruder/cylinder diameter of extruder) was 48 (the number of barrels: 12). In this biaxial extruder, the temperature of the section from the upstream side feed port to a die, the number of rotations of the screw, and the amount to be discharged were set to be 290° C., 300 rpm, and 25 kg/hour, respectively. Under such conditions, the polyamide resin (A) and the thermal stabilizer (D) were fed through the upstream side feed port, the glass fiber (B) was fed through the first downstream side feed port and the copolymer (C) was fed through the second downstream side feed port so that the proportions described in the upper portion in Table 1 below were achieved, and the resultant was molten and kneaded to produce a resin composition pellet. The resulting resin composition was molded, and the resulting molded piece was used for evaluation of vibration fatigue resistance, the outer appearance of the molded body, and the like.

Examples 2 to 24 and Comparative Examples 1 to 3

A pellet and a test piece in each of Examples 2 to 24 and Comparative Examples 1 to 3 were produced in the same manner as in Example 1 except that the types and the contents of the polyamide resin (A), the glass fiber (B), the copolymer (C) and the thermal stabilizer (D) were changed as in Tables 1 to 4, and were subjected to respective tests.

Example 25

A biaxial extruder (ZSK-26MC: manufactured by Coperion GmbH (Germany)) was used as an extruder. This biaxial extruder had an upstream side feed port in the first barrel from the upstream side, had a first downstream side feed port in the sixth barrel from the upstream side, and had a second downstream side feed port in the eighth barrel from the upstream side. Then, the L/D (cylinder length of extruder/cylinder diameter of extruder) was 48 (the number of barrels: 12). In this biaxial extruder, the temperature of the section from the upstream side feed port to a die, the number of rotations of the screw, and the amount to be discharged were set to be 290° C., 300 rpm, and 25 kg/hour, respectively. Under such conditions, the polyamide resin (A), the copolymer (C) and the thermal stabilizer (D) were fed through the upstream side feed port and the glass fiber (B) was fed through the first downstream side feed port so that the proportions described in the upper portion in Table 1 below were achieved, and the resultant was molten and kneaded to produce a resin composition pellet. The resulting resin composition was molded, and the resulting molded piece was used for evaluation of vibration fatigue resistance, the outer appearance of the molded body, and the like.

Herein, numerical values in Table each represent part(s) by mass. The symbol "–" represents "not measured".

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Raw materials |  |  |  |  |  |  |  |  |  |  |
|  | A-1 | 100 | 100 | 100 |  |  |  |  |  |  |
|  | A-2 |  |  |  |  |  | 100 |  |  |  |
|  | A-3 |  |  |  | 100 |  |  |  |  |  |
|  | A-4 |  |  |  |  |  |  | 100 |  |  |
|  | A-5 |  |  |  |  | 100 |  |  |  |  |
|  | A-6 |  |  |  |  |  |  |  | 100 |  |
|  | A-7 |  |  |  |  |  |  |  |  | 100 |
|  | B-1 | 50 | 50 | 50 | 50 | 50 | 50 | 50 | 50 | 50 |
|  | C-1 | 0.15 | 0.15 |  | 0.15 | 0.15 | 0.15 | 0.15 | 0.15 | 0.15 |
|  | C-6 |  |  | 0.15 |  |  |  |  |  |  |
|  | D-1 | 0.0538 |  | 0.0538 | 0.0538 | 0.0538 | 0.0538 | 0.0538 | 0.0538 | 0.0538 |
|  | D-2 |  | 0.0467 |  |  |  |  |  |  |  |
| Items measured | Units |  |  |  |  |  |  |  |  |  |
| Vibration fatigue resistance test, measurement condition 1 | Number of vibrations until fracture of test piece (times) | 2.9.E+05 | 2.9.E+05 | 3.0.E+05 | 3.0.E+05 | 1.0.E+05 | 8.0.E+04 | 2.8.E+05 | 2.7.E+05 | 2.5.E+05 |
| Vibration fatigue resistance test, measurement condition 2 | Number of vibrations until fracture of test piece (times) | 2.9.E+06 | 3.1.E+06 | — | — | — | — | — | — | — |
| Tensile strength at 23° C. | [MPa] | 217 | — | 214 | — | — | — | — | — | — |
| Color tone | b value | 2 | — | — | 4 | 2 | — | — | — | — |
| Amount of grafted polyamide resin | [Part(s) by mass per 100 parts by mass of glass fiber] | 1.1 | — | — | 1.3 | 0.8 | — | — | — | — |

TABLE 2

|  | Example 1 | Example 10 | Comparative Example 1 | Example 11 | Example 12 | Example 13 | Example 14 | Example 15 |
|---|---|---|---|---|---|---|---|---|
| Raw materials |  |  |  |  |  |  |  |  |
| A-1 | 100 | 100 | 100 | 100 | 100 | 100 | 100 | 100 |
| B-1 | 50 |  |  |  |  | 33 | 100 |  |
| B-2 |  | 50 |  |  |  |  |  |  |
| B-3 |  |  | 50 |  |  |  |  |  |
| B-4 |  |  |  | 50 |  |  |  |  |
| B-5 |  |  |  |  | 50 |  |  |  |
| B-6 |  |  |  |  |  |  |  | 50 |

TABLE 2-continued

|  | | Example 1 | Example 10 | Comparative Example 1 | Example 11 | Example 12 | Example 13 | Example 14 | Example 15 |
| --- | --- | --- | --- | --- | --- | --- | --- | --- | --- |
| C-1 | | 0.15 | 0.15 | 0.15 | 0.15 | 0.15 | 0.15 | 0.15 | 0.15 |
| D-1 | | 0.0538 | 0.0538 | 0.0538 | 0.0538 | 0.0538 | 0.0538 | 0.0538 | 0.0538 |
| Items measured | Units | | | | | | | | |
| Vibration fatigue resistance test, measurement condition 1 | Number of vibrations until fracture of test piece (times) | 2.9.E+05 | 2.4.E+05 | 2.0.E+04 | 5.0.E+05 | 1.5.E+05 | 2.0.E+05 | 3.3.E+05 | 2.6.E+05 |
| Tensile strength at 23° C. | [MPa] | 217 | 216 | 215 | 219 | 201 | 180 | 230 | — |
| Tensile strength at 80° C. | [MPa] | 156 | 153 | 146 | — | — | — | — | — |
| Tensile strength at 80° C./Tensile strength at 23° C. | | 0.72 | 0.71 | 0.68 | — | — | — | — | — |
| Tensile strength at 120° C. | [MPa] | 121 | 119 | 114 | — | — | — | — | — |
| Tensile strength at 120° C./Tensile strength at 23° C. | | 0.56 | 0.55 | 0.53 | — | — | — | — | — |
| Smoothness of outer appearance | Visual observation | Excellent | — | — | — | — | — | — | Good |
| Amount of grafted polyamide resin | [Part(s) by mass per 100 parts by mass of glass fiber] | 1.1 | — | 0.1 | — | — | — | — | — |

TABLE 3

|  |  | Example 1 | Example 16 | Example 17 | Comparative Example 2 | Example 18 |
| --- | --- | --- | --- | --- | --- | --- |
| Raw materials | | | | | | |
| A-1 | | 100 | 100 | 100 | 100 | 100 |
| B-1 | | 50 | 50 | 50 | 50 | 50 |
| C-1 | | 0.15 | | | | |
| C-2 | | | 0.15 | | | |
| C-3 | | | | 0.15 | | |
| C-4 | | | | | 0.15 | |
| C-5 | | | | | | 0.15 |
| D-1 | | 0.0538 | 0.0538 | 0.0538 | 0.0538 | 0.0538 |
| Items measured | Units | | | | | |
| Vibration fatigue resistance test, measurement condition 1 | Number of vibrations until fracture of test piece (times) | 2.9.E+05 | 2.0.E+05 | 1.8.E+05 | 2.9.E+04 | 2.9.E+05 |
| Tensile strength at 23° C. | [MPa] | 217 | 216 | 215 | 215 | 217 |
| Tensile strength at 80° C. | [MPa] | 156 | 153 | 151 | 145 | 155 |
| Tensile strength at 80° C./Tensile strength at 23° C. | | 0.72 | 0.71 | 0.70 | 0.67 | 0.71 |
| Tensile strength at 120° C. | [MPa] | 121 | 119 | 117 | 114 | 121 |
| Tensile strength at 120° C./Tensile strength at 23° C. | | 0.56 | 0.55 | 0.54 | 0.53 | 0.56 |
| Color tone | b value | 2 | 6 | — | — | — |

TABLE 4

| | Units | Example 1 | Example 19 | Example 20 | Example 21 | Example 22 | Example 23 | Example 24 | Example 25 | Comparative Example 3 |
|---|---|---|---|---|---|---|---|---|---|---|
| Raw materials | | | | | | | | | | |
| A-1 | | 100 | 100 | 100 | 100 | 100 | 100 | 100 | 100 | 100 |
| B-1 | | 50 | 50 | 50 | 50 | 50 | 50 | 50 | 50 | 50 |
| C-1 | | 0.15 | 0.45 | 0.3 | 0.1 | 0.05 | 0.005 | 0.15 | 0.15 | |
| D-1 | | 0.0538 | 0.0538 | 0.0538 | 0.0538 | 0.0538 | 0.0538 | | 0.0538 | 0.0538 |
| D-3 | | | | | | | | 0.2 | | |
| Items measured | | | | | | | | | | |
| Vibration fatigue resistance test, measurement condition 1 | Number of vibrations until fracture of test piece (times) | 2.9.E+05 | 2.0.E+05 | 2.9.E+05 | 2.9.E+05 | 2.5.E+05 | 1.5.E+05 | 2.9.E+05 | 5.8.E+04 | 2.9.E+04 |
| Vibration fatigue resistance test, measurement condition 2 | Number of vibrations until fracture of test piece (times) | 2.9.E+06 | — | — | — | — | — | 2.5.E+06 | — | — |
| Tensile strength at 23° C. | [MPa] | 217 | 215 | 217 | 217 | 215 | 215 | — | 217 | 215 |
| Tensile strength at 80° C. | [MPa] | 156 | 151 | 156 | 156 | 148 | 146 | — | 145 | 145 |
| Tensile strength at 80° C./ Tensile strength at 23° C. | | 0.72 | 0.70 | 0.72 | 0.72 | 0.69 | 0.68 | — | 0.67 | 0.67 |
| Tensile strength at 120° C. | [MPa] | 121 | 115 | 118 | 120 | 117 | 114 | — | 114 | 114 |
| Tensile strength at 120° C./ Tensile strength at 23° C. | | 0.56 | 0.53 | 0.54 | 0.55 | 0.54 | 0.53 | — | 0.53 | 0.53 |
| Charpy notched impact strength | [kJ/m^2] | 16.3 | 17 | 16.5 | 16.3 | 16.1 | 16.1 | — | 16.3 | 16 |
| Bending strength | [MPa] | 330 | — | — | — | — | — | — | — | 332 |
| Tensile strength after water absorption | [MPa] | 111 | — | — | — | — | — | — | 110 | — |
| Smoothness of outer appearance | Visual observation | Excellent | Poor | Good | Excellent | Excellent | Excellent | — | Excellent | Excellent |
| Tensile strength after thermal aging at 120° C. for 5000 hours | [MPa] | 165 | 155 | 160 | 165 | 165 | 165 | — | — | 165 |
| Tensile strength retention rate after thermal aging at 120° C. for 5000 hours | | 0.76 | 0.72 | 0.74 | 0.76 | 0.77 | 0.77 | — | — | — |
| Amount of grafted polyamide resin | [Part(s) by mass per 100 parts by mass of glass fiber] | 1.1 | — | — | — | — | — | — | 0.6 | 1.0 |

It was revealed from Tables 1 to 4 that the polyamide resin composition in each of Examples 1 to 25 exhibits excellent vibration fatigue resistance.

The present application claims a priority based on the Japanese Patent Application (Japanese Patent Application No. 2013-129862) filed on Jun. 20, 2013, the entire content of which is herein incorporated by reference.

INDUSTRIAL APPLICABILITY

The glass fiber-reinforced thermoplastic polyamide resin composition according to the present invention is industrially applicable as a material for molded bodies, such as automobile parts and electronic components (connector, switch or the like), demanded to have durability at a high level, in particular, vibration fatigue resistance.

The invention claimed is:

1. A polyamide resin composition comprising:
   (A) a polyamide resin,
   (B) a glass fiber comprising a compound comprising a carboxylic anhydride-containing unsaturated vinyl monomer, the compound being on at least a part of a surface of the glass fiber, and
   (C) a copolymer comprising a carboxylic anhydride-containing unsaturated vinyl monomer and having a glass transition temperature Tg of higher than 0° C., wherein the polyamide resin in the polyamide resin composition satisfies a relationship of amount of carboxyl terminal/amount of amino terminal >1, and wherein a ratio of an amount of amino terminal of the polyamide resin (A) is 40 mmol/kg or more.

2. The polyamide resin composition according to claim 1, wherein a grafted polyamide resin is present at an interface between the polyamide resin and the glass fiber (B) and an amount of the grafted polyamide resin is 0.15 to 2 parts by mass based on 100 parts by mass of the glass fiber (B), in the polyamide resin composition.

3. The polyamide resin composition according to claim 1, wherein the polyamide resin composition exhibits a ratio of a tensile strength at 80° C. to a tensile strength at 23° C. of 70% or more.

4. The polyamide resin composition according to claim 2, comprising the glass fiber (B) in an amount of 5 parts by mass or more and 200 parts by mass or less based on 100 parts by mass of the polyamide resin (A), and comprising the copolymer (C) in an amount of 0.01 parts by mass or more and 2 parts by mass or less based on 100 parts by mass of the polyamide resin (A).

5. The polyamide resin composition according to claim 2, wherein a weight average molecular weight of the copolymer (C) is 600000 or less.

6. The polyamide resin composition according to claim 2, wherein an acid value of the copolymer (C) is 0.1 or more.

7. The polyamide resin composition according to claim 2, wherein the polyamide resin (A) comprises at least one selected from the group consisting of polyamide 46 (polytetramethylene adipamide), polyamide 66 (polyhexamethylene adipamide), polyamide 610 (polyhexamethylene sebacamide), polyamide 612 (polyhexamethylene dodecamide), polyamide 6T (polyhexamethylene terephthalamide), polyamide 9T (polynonanemethylene terephthalamide), polyamide 6I (polyhexamethylene isophthalamide) and polyamide MXD6 (polymetaxylylene adipamide), and a copolymerized polyamide comprising any of them as a constituent component.

8. The polyamide resin composition according to claim 2, further comprising (D) a thermal stabilizer.

9. The polyamide resin composition according to claim 8, wherein the thermal stabilizer (D) comprises copper.

10. The polyamide resin composition according to claim 2, wherein the glass fiber (B) is substantially a chopped strand cut to 2.8 mm to 3.2 mm.

11. The polyamide resin composition according to claim 2, wherein the polyamide is obtained by melting and kneading the polyamide resin (A) and the glass fiber (B), and thereafter adding the copolymer (C) thereto and further melting and kneading a resultant thereof.

12. A molded body comprising the polyamide resin composition according to claim 2.

13. An automobile part comprising the polyamide resin composition according to claim 2.

14. A method for producing a polyamide resin composition comprising:
   (a) melting and kneading (A) a polyamide resin, and (B) a glass fiber comprising a compound comprising a carboxylic anhydride-containing unsaturated vinyl monomer, the compound being on at least a part of a surface of the glass fiber, and
   (b) melting and kneading (C) a copolymer comprising a carboxylic anhydride-containing unsaturated vinyl monomer and having a glass transition temperature Tg of higher than 0° C., after the (a), wherein the polyamide resin in the polyamide resin composition satisfies a relationship of amount of carboxyl terminal/amount of amino terminal >1, and wherein a ratio of an amount of amino terminal of the polyamide resin (A) is 40 mmol/kg or more.

15. The polyamide resin composition according to claim 2, wherein the polyamide resin composition exhibits a ratio of a tensile strength at 80° C. to a tensile strength at 23° C. is of 70% or more.

* * * * *